US011361367B2

(12) United States Patent
Sonoda et al.

(10) Patent No.: US 11,361,367 B2
(45) Date of Patent: Jun. 14, 2022

(54) INFORMATION SUGGESTION SYSTEM, INFORMATION SUGGESTION METHOD, PROGRAM, AND RECORDING MEDIUM

(71) Applicant: FUJIFILM Corporation, Tokyo (JP)

(72) Inventors: Shinichiro Sonoda, Tokyo (JP); Nobuya Tanaka, Tokyo (JP); Hirotoshi Yoshizawa, Tokyo (JP); Tetsuya Matsumoto, Tokyo (JP); Kei Yamaji, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 98 days.

(21) Appl. No.: 16/874,528

(22) Filed: May 14, 2020

(65) Prior Publication Data
US 2021/0004890 A1 Jan. 7, 2021

(30) Foreign Application Priority Data

Jul. 3, 2019 (JP) .............................. JP2019-124390

(51) Int. Cl.
*G06T 7/70* (2017.01)
*G06Q 30/06* (2012.01)
(Continued)

(52) U.S. Cl.
CPC ....... *G06Q 30/0631* (2013.01); *G06K 9/6201* (2013.01); *G06N 3/08* (2013.01);
(Continued)

(58) Field of Classification Search
None
See application file for complete search history.

(56) References Cited

U.S. PATENT DOCUMENTS 6,711,293 B1 * 3/2004 Lowe ................... G06K 9/4671
382/219
8,611,677 B2 * 12/2013 Das ....................... G06F 16/285
382/225
(Continued)

FOREIGN PATENT DOCUMENTS

JP 2006-106404 A 4/2006
JP 2011-141892 A 7/2011
(Continued)

OTHER PUBLICATIONS

An Office Action; "Notice of Reasons for Refusal", mailed by the Japanese Patent Office dated Apr. 26, 2022, which corresponds to Japanese Patent Application No. 2019-124390 and is related to U.S. Appl. No. 16/874,528; with English language translation.

*Primary Examiner* — Delomia L Gilliard
(74) *Attorney, Agent, or Firm* — Studebaker & Brackett PC

(57) ABSTRACT

There are provided an information suggestion system, an information suggestion method, a program, and a recording medium capable of suggesting, to a user, information on a product matching a hobby and the preference of the user from an image group of the user. In the information suggestion system, the information suggestion method, the program, and the recording medium, an image group acquisition unit acquires an image group of a user, and an image analysis unit detects an attribute of each image. An imaging number count unit counts an imaging number of same-attribute images, and an imaging frequency calculation unit calculates an imaging frequency of the same-attribute images. An imaging purpose estimation unit estimates an imaging purpose of the same-attribute images. A suggestion decision unit decides whether or not to suggest information on a product related to the imaging purpose of the same-attribute images to the user depending on whether the (Continued)

imaging number and the imaging frequency of the same-attribute images satisfy a predetermined condition, and an information suggestion unit suggests information on a product decided to be suggested to the user.

15 Claims, 5 Drawing Sheets

(51) Int. Cl.
  *G06K 9/62* (2022.01)
  *G06N 3/08* (2006.01)
  *G06V 10/75* (2022.01)
(52) U.S. Cl.
  CPC .............. *G06T 7/70* (2017.01); *G06V 10/751* (2022.01); *G06T 2207/20081* (2013.01); *G06T 2207/20084* (2013.01); *G06T 2207/30196* (2013.01); *G06T 2207/30242* (2013.01)

(56) References Cited

U.S. PATENT DOCUMENTS

| | | | | |
|---|---|---|---|---|
| 8,756,114 | B2* | 6/2014 | Fredlund | G06Q 30/02 705/26.5 |
| 8,934,717 | B2* | 1/2015 | Newell | G06F 16/435 382/190 |
| 2004/0143844 | A1* | 7/2004 | Brant | H04N 21/854 725/42 |
| 2011/0010363 | A1* | 1/2011 | Homma | G06Q 30/02 707/723 |
| 2011/0246561 | A1 | 10/2011 | Eshima et al. | |
| 2012/0179716 | A1* | 7/2012 | Takami | G06F 16/35 707/771 |
| 2012/0321192 | A1* | 12/2012 | Marshall | G06Q 10/107 382/190 |
| 2014/0149376 | A1* | 5/2014 | Kutaragi | G06F 16/532 707/706 |
| 2014/0258271 | A1* | 9/2014 | Kong | G06F 16/5866 707/722 |
| 2015/0086116 | A1* | 3/2015 | Yamaji | G06K 9/00684 382/190 |
| 2017/0032187 | A1* | 2/2017 | Saito | G06K 9/6814 |
| 2017/0193588 | A1* | 7/2017 | Loui | G06Q 30/0643 |
| 2017/0351417 | A1* | 12/2017 | Manico | G06F 16/50 |
| 2018/0225581 | A1* | 8/2018 | Oyamada | G06N 20/10 |
| 2019/0197364 | A1* | 6/2019 | Cheng | G06F 16/51 |
| 2020/0105036 | A1* | 4/2020 | Yokoyama | G06K 9/00677 |
| 2021/0012359 | A1* | 1/2021 | Masuda | G06F 16/9535 |

FOREIGN PATENT DOCUMENTS

| | | |
|---|---|---|
| JP | 2011-193325 A | 9/2011 |
| JP | 2011-215964 A | 10/2011 |
| JP | 2013-050502 A | 3/2013 |
| JP | 2013-161116 A | 8/2013 |
| JP | 2014-216004 A | 11/2014 |
| JP | 2017-033293 A | 2/2017 |
| JP | 2017-076315 A | 4/2017 |
| JP | 2018-151837 A | 9/2018 |

* cited by examiner

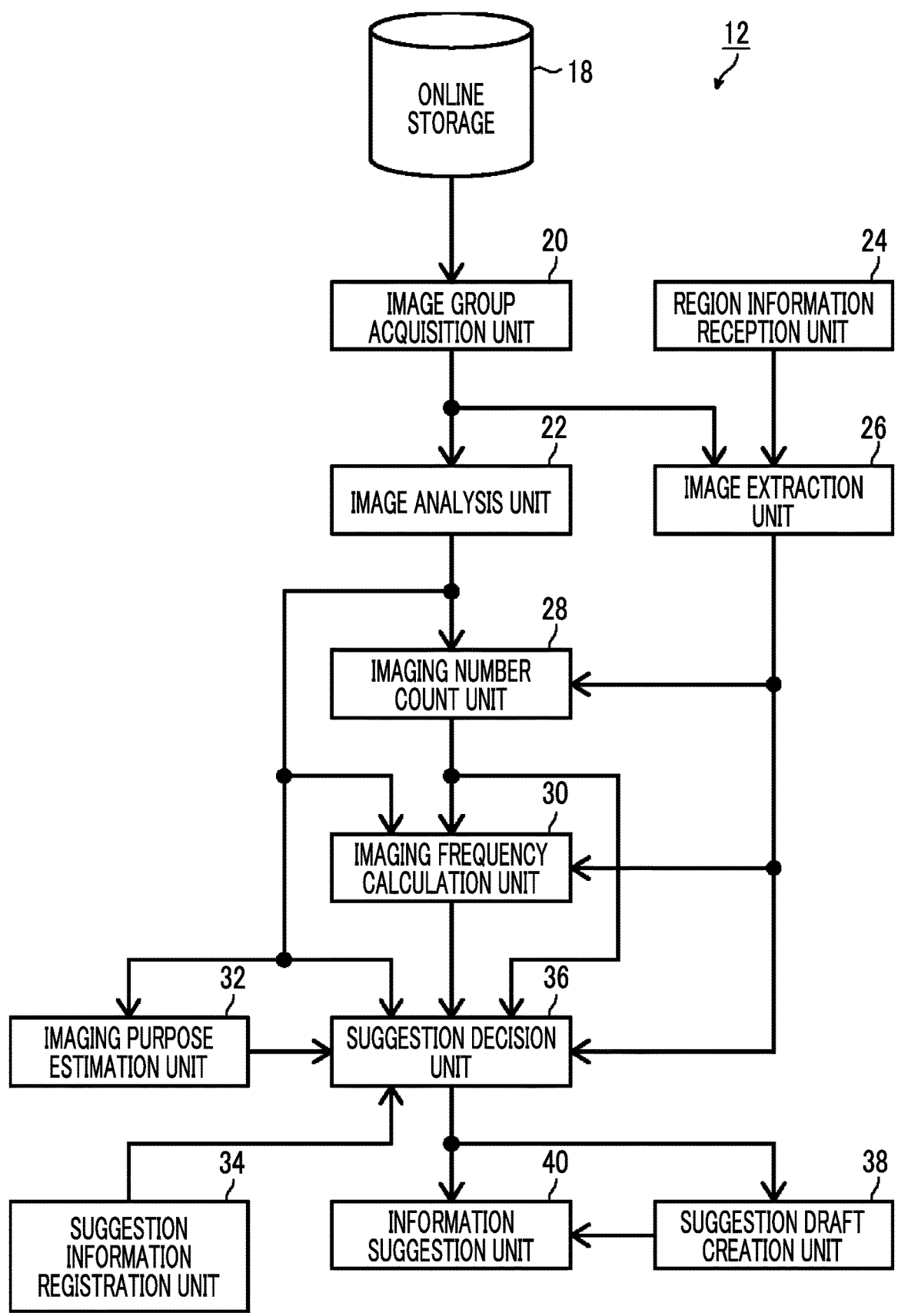

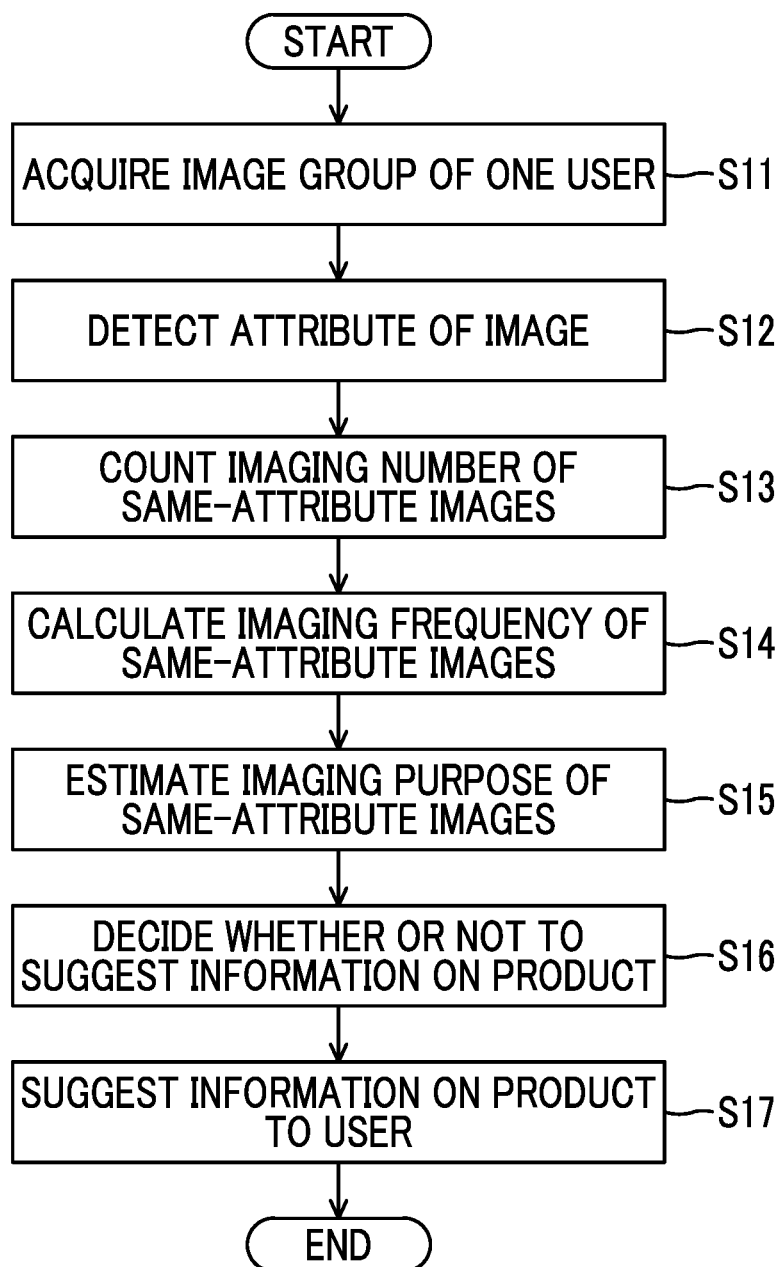

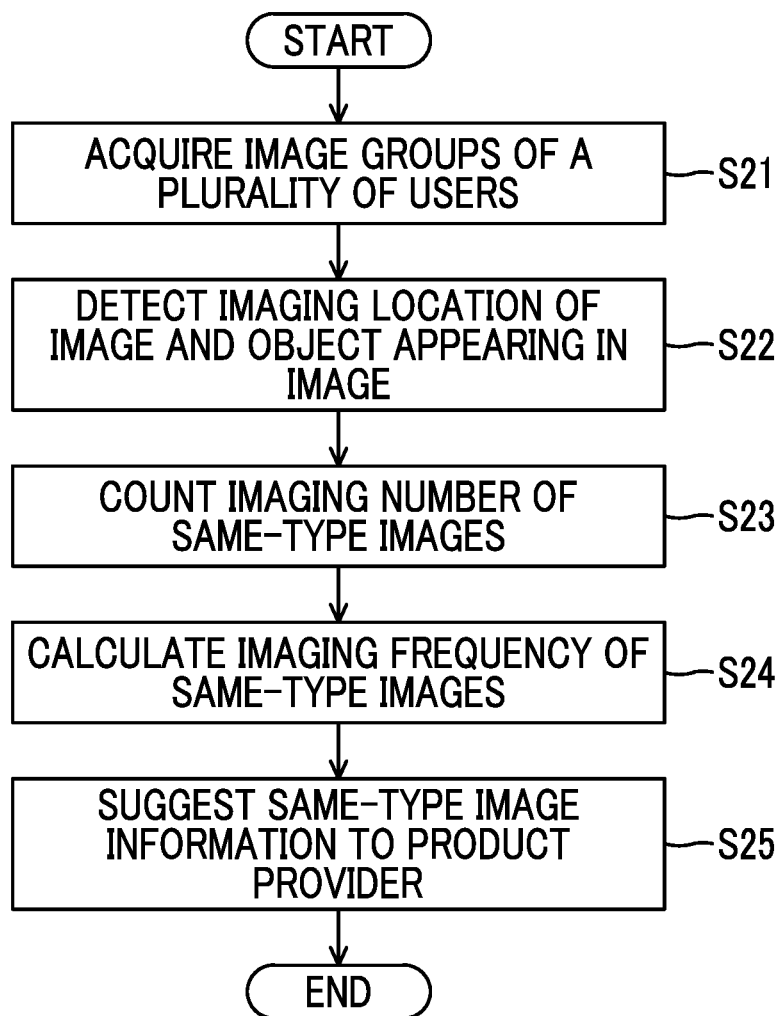

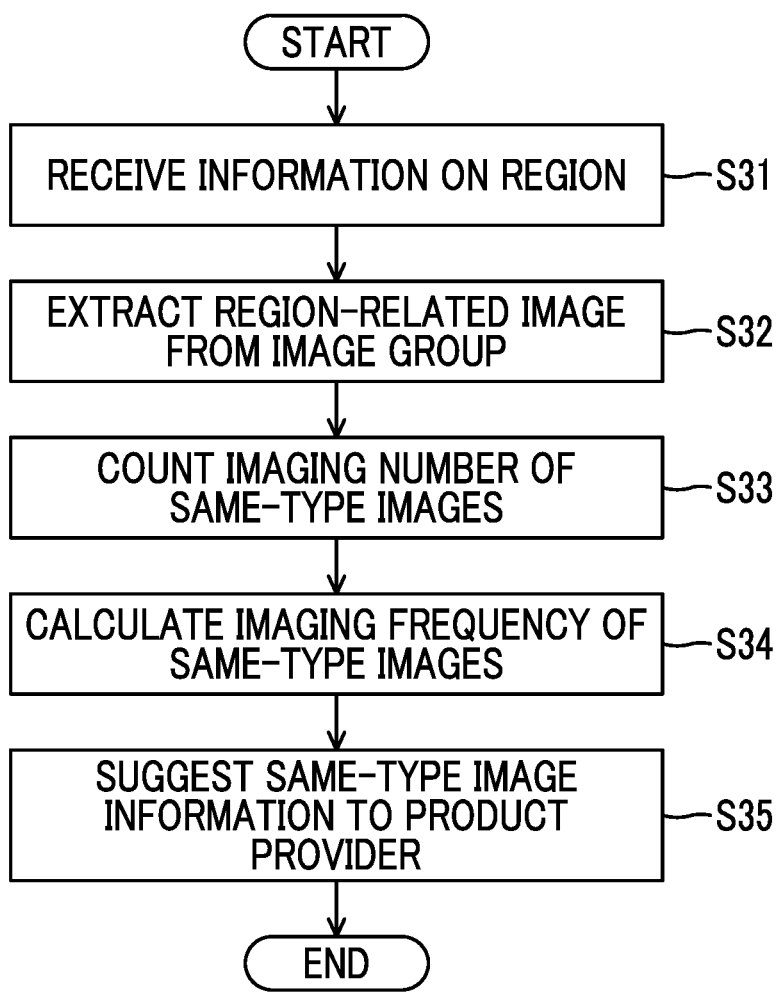

INFORMATION SUGGESTION SYSTEM, INFORMATION SUGGESTION METHOD, PROGRAM, AND RECORDING MEDIUM

CROSS-REFERENCE TO RELATED APPLICATIONS

The present application claims priority under 35 U.S.C. § 119 to Japanese Patent Application No. 2019-124390, filed on Jul. 3, 2019. The above application is hereby expressly incorporated by reference, in its entirety, into the present application.

BACKGROUND OF THE INVENTION

1. Field of the Invention

The present invention relates to an information suggestion system, an information suggestion method, a program, and a recording medium for suggesting information on a product to a user and suggesting information for suggesting the information on the product to the user to a product provider.

2. Description of the Related Art

There are considerably many related arts as a technology for suggesting information related to purchase of a new product to a user based on a purchase history and a browsing history of the user.

For example, JP2013-161116A describes a recommendation system that associates identification information of contents (image and motion picture), an image of a product, and person information (age and gender) of a user included in the contents with each other, and recommends product information in consideration of the person information of the user.

JP2011-141892A describes a recommendation system that outputs information corresponding to identification information of an article category other than an article category related to an article included in an image among article categories related to a category corresponding to an article category related to an article included in the image.

JP2017-076315A describes an image processing device that estimates a tendency of clothes of a person while referring to a plurality of captured images of the person, selects the clothes related to the person among a plurality of clothes based on the estimated tendency of the clothes of the person, and outputs information on the selected clothes.

JP2017-033293A describes an image processing device that performs image analysis on images included in an image group uploaded to a server.

JP2013-050502A describes an advertisement display control device that constructs an advertisement database in which advertisement data and a feature value of the advertisement data are associated with each other, and performs matching processing between a feature value of the image data and the feature value of the advertisement data, decides a display position by controlling a display position of the advertisement data, and displays the advertisement data on a client terminal.

JP2006-106404A describes an advertisement display method of associating a common element with an advertisement in an advertisement database in a one-to-one correspondence, selecting an advertisement related to the common element from the advertisement database, and displaying the selected advertisement.

JP2014-216004A describes a customer management system that obtains product consumption characteristic in which a product or a service provided to a customer is consumed, calculates a timing when the product is recommended based on the obtained product consumption characteristics, and provides information for prompting the customer to purchase the product based on the obtained timing.

SUMMARY OF THE INVENTION

However, there are no related arts for suggesting information on a product related to purchase of the product from an analysis result of an image group of a user stored in a storage such as an online storage, and suggesting information for suggesting the information on the product to the user to a product provider who suggests the information on the product to the user and sells the product to the user as will be suggested by the present invention.

For example, an image published on a social networking service (SNS) is intended to transmit information to other users from the beginning. In contrast, the image group stored in the online storage includes more private feelings with close family members and friends. Therefore, it is considered that a suggestion of information different from a suggestion of information from an image published on SNS can be realized from the image group stored in the online storage.

Therefore, an object of the present invention is to provide an information suggestion system, an information suggestion method, a program, and a recording medium capable of suggesting, to a user, information on a product matching a hobby and a preference of the user from an image group of the user.

In order to achieve the aforementioned object, the present invention provides an information suggestion system comprising an image group acquisition unit that acquires an image group of a user stored in a storage, an image analysis unit that detects an attribute of each image included in the image group of the user by analyzing the each image, and detects a plurality of attributes of a plurality of images included in the image group of the user, an imaging number count unit that counts an imaging number of same-attribute images having a same attribute for each attribute in the image group of the user, an imaging frequency calculation unit that calculates an imaging frequency of the same-attribute images from the imaging number of the same-attribute images for each attribute in the image group of the user, an imaging purpose estimation unit that estimates an imaging purpose of the same-attribute images for each attribute, a suggestion decision unit that decides whether or not to suggest information on a product related to the imaging purpose of the same-attribute images to the user depending on whether or not the imaging number and the imaging frequency of the same-attribute images satisfy a predetermined condition for each attribute, and an information suggestion unit that suggests, to the user, the information on the product decided to be suggested to the user.

In the information suggestion system, it is preferable that the information on the product to be suggested to the user includes information on a product related to a periodic event occurring at a predetermined cycle and the information suggestion unit suggests the information on the product related to the periodic event to the user before a predetermined period from a timing when a next periodic event occurs.

The information suggestion system further comprises a suggestion information registration unit that registers one or more pieces of suggestion information obtained by associating the imaging purpose with the information on the product. It is preferable that the suggestion decision unit searches for suggestion information including an imaging purpose matching an imaging purpose of same-attribute images of which the imaging number and the imaging frequency satisfy the predetermined condition from among the one or more pieces of suggestion information and the information suggestion unit suggests the information on the product included in the suggestion information searched for by the suggestion decision unit to the user.

It is preferable that the suggestion information registration unit registers, as the one or more pieces of suggestion information, suggestion information obtained by associating two or more imaging purposes with the information on the product and the suggestion decision unit searches for suggestion information including two or more imaging purposes matching two or more imaging purposes of two or more same-attribute images of which the imaging number and the imaging frequency satisfy the predetermined condition.

It is preferable that the attribute includes at least one of an imaging date and time of an image, an imaging location of an image, an imaging direction of an image, a person appearing in an image, an object appearing in an image, or a scene appearing in an image.

It is preferable that the imaging purpose is imaging of a predetermined object and the suggestion decision unit decides to suggest information on a product related to an imaging purpose of an image in which the predetermined object is captured to the user regardless of whether or not the predetermined condition is satisfied.

It is preferable that the image group of the user includes an image that is not published to other users.

It is preferable that the imaging purpose estimation unit creates a learned model which learns a relationship between an imaging number and an imaging frequency of learning same-attribute images having a same attribute and an imaging purpose in advance for a plurality of sets of the learning same-attribute images, and estimates the imaging purpose of the same-attribute images from the same-attribute images by using the learned model.

It is preferable that the learned model is a neural network and in a case where information on an imaging number and an imaging frequency of one set of the learning same-attribute images and the imaging purpose corresponding to the imaging number and the imaging frequency of the one set of the learning same-attribute images is obtained, the imaging purpose estimation unit performs change processing for changing a coefficient of each node constituting the neural network such that an output error based on an imaging purpose output in a case where the imaging number and the imaging frequency of the plurality of sets and the one set of the learning same-attribute images are input is minimized, and creates the learned model by repeatedly performing the change processing.

The present invention provides an information suggestion method comprising acquiring, by an image group acquisition unit, an image group of a user stored in a storage, detecting, by an image analysis unit, an attribute of each image included in the image group of the user by analyzing the each image, and detecting a plurality of attributes of a plurality of images included in the image group of the user, counting, by an imaging number count unit, an imaging number of same-attribute images having a same attribute for each attribute in the image group of the user, calculating, by an imaging frequency calculation unit, an imaging frequency of the same-attribute images from the imaging number of the same-attribute images for each attribute in the image group of the user, estimating, by an imaging purpose estimation unit, an imaging purpose of the same-attribute images for each attribute, deciding, by a suggestion decision unit, whether or not to suggest information on a product related to the imaging purpose of the same-attribute images to the user depending on whether or not the imaging number and the imaging frequency of the same-attribute images satisfy a predetermined condition for each attribute, and suggesting, by an information suggestion unit, to the user, the information on the product decided to be suggested to the user.

In the information suggestion method, it is preferable that the information on the product to be suggested to the user includes information on a product related to a periodic event occurring at a predetermined cycle and the information on the product related to the periodic event is suggested to the user before a predetermined period from a timing when a next periodic event occurs.

The information suggestion method further comprises registering, by a suggestion information registration unit, one or more pieces of suggestion information obtained by associating the imaging purpose with the information on the product. It is preferable that suggestion information including an imaging purpose matching an imaging purpose of same-attribute images of which the imaging number and the imaging frequency satisfy the predetermined condition is searched from among the one or more pieces of suggestion information and the information on the product included in the searched suggestion information is suggested to the user.

It is preferable that suggestion information obtained by associating two or more imaging purposes with the information on the product is registered as the one or more pieces of suggestion information and suggestion information including two or more imaging purposes matching two or more imaging purposes of two or more same-attribute images of which the imaging number and the imaging frequency satisfy the predetermined condition is searched for.

It is preferable that the attribute includes at least one of an imaging date and time of an image, an imaging location of an image, an imaging direction of an image, a person appearing in an image, an object appearing in an image, or a scene appearing in an image.

It is preferable that the imaging purpose is imaging of a predetermined object and information on a product related to an imaging purpose of an image in which the predetermined object is captured is decided to be suggested to the user regardless of whether or not the predetermined condition is satisfied.

It is preferable that the image group of the user includes an image that is not published to other users.

It is preferable that a learned model which learns a relationship between an imaging number and an imaging frequency of learning same-attribute images having a same attribute and an imaging purpose is created in advance for a plurality of sets of the learning same-attribute images, and the imaging purpose of the same-attribute images is estimated from the same-attribute images by using the learned model.

It is preferable that the learned model is a neural network, and in a case where information on an imaging number and an imaging frequency of one set of the learning same-attribute images and the imaging purpose corresponding to the imaging number and the imaging frequency of the one set of the learning same-attribute images is obtained, change processing for changing a coefficient of each node constituting the neural network is performed such that an output error based on an imaging purpose output in a case where the imaging number and the imaging frequency of the plurality of sets and the one set of the learning same-attribute images are input is minimized, and the learned model is created by repeatedly performing the change processing.

The present invention provides a program causing a computer to execute the steps of any information suggestion method described above.

The present invention provides a non-transitory computer-readable recording medium having a program causing a computer to execute the steps of any information suggestion method described above recorded thereon.

The present invention provides an information suggestion system comprising an image group acquisition unit that acquires an image group of a user stored in a storage, an image analysis unit that detects an attribute of each image included in the image group of the user by analyzing the each image, and detects a plurality of attributes of a plurality of images included in the image group of the user, an imaging number count unit that counts an imaging number of same-attribute images having a same attribute for each attribute in the image group of the user, an imaging frequency calculation unit that calculates an imaging frequency of the same-attribute images from the imaging number of the same-attribute images for each attribute in the image group of the user, an imaging purpose estimation unit that estimates an imaging purpose of the same-attribute images for each attribute, a suggestion decision unit that decides whether or not to suggest information on a product related to the imaging purpose of the same-attribute images to the user depending on whether or not the imaging number and the imaging frequency of the same-attribute images satisfy a predetermined condition for each attribute, and an information suggestion unit that suggests, to the user, the information on the product decided to be suggested to the user. The image group acquisition unit, the image analysis unit, the imaging number count unit, the imaging frequency calculation unit, the imaging purpose estimation unit, the suggestion decision unit, and the information suggestion unit are hardware or processors that execute programs.

In the information suggestion system further comprises a suggestion information registration unit that registers one or more pieces of suggestion information obtained by associating the imaging purpose with the information on the product. It is preferable that the suggestion information registration unit is hardware or a processor that executes a program, the suggestion decision unit searches for suggestion information including an imaging purpose matching an imaging purpose of same-attribute images of which the imaging number and the imaging frequency satisfy the predetermined condition from among the one or more pieces of suggestion information, and the information suggestion unit suggests the information on the product included in the suggestion information searched for by the suggestion decision unit to the user.

According to the present invention, the imaging purpose of the same-attribute images is estimated for each attribute of the image, and the information on the product related to the imaging purpose of the same-attribute images is suggested to the user. Therefore, the personal hobby and preference of the user, the hobby and preference shared with friends, or the hobby and preference that family members like can be appropriately determined from the imaging purpose of the same-attribute image, the hobby and preference of the user can be widely and appropriately estimated, and the information on the corresponding product can be appropriately suggested.

BRIEF DESCRIPTION OF THE DRAWINGS

FIG. 2 is a block diagram of an embodiment showing a configuration of a server.

FIG. 3 is a flowchart of an embodiment showing an operation of the information suggestion system in a case where information is suggested to one user.

FIG. 4 is a flowchart of an embodiment showing an operation of the information suggestion system in a case where information is suggested to a product provider.

FIG. 5 is a flowchart of another embodiment showing the operation of the information suggestion system in a case where the information is suggested to the product provider.

DESCRIPTION OF THE PREFERRED EMBODIMENTS

Figure 1:
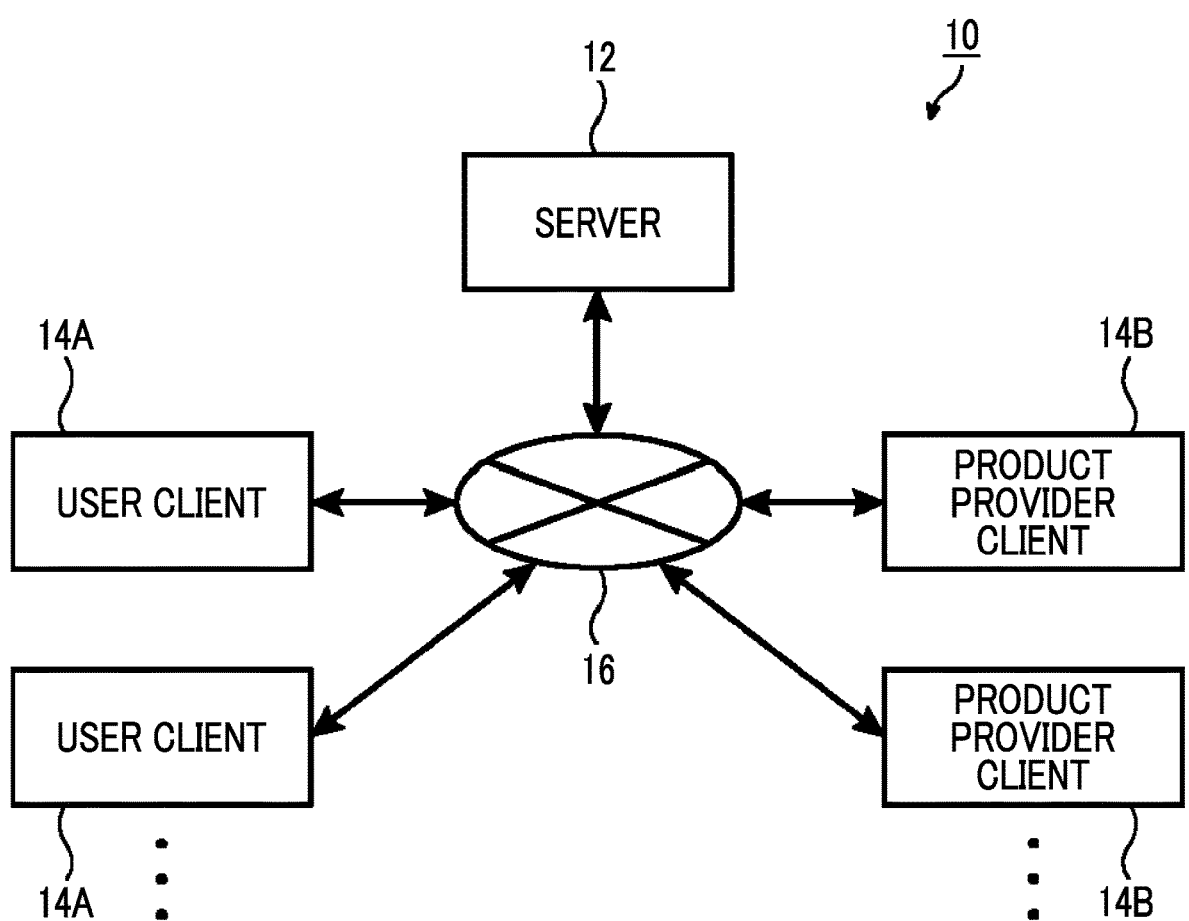
FIG. 1 is a block diagram of an embodiment showing a configuration of an information suggestion system according to an embodiment of the present invention.

Hereinafter, an information suggestion system, an information suggestion method, a program, and a recording medium according to an embodiment of the present invention will be described in detail based on preferred embodiments shown in the accompanying drawings.

FIG. 1 is a block diagram of an embodiment showing a configuration of the information suggestion system according to the embodiment of the present invention. An information suggestion system 10 shown in FIG. 1 suggests information on a product to a user, and suggests information for suggesting information for suggesting the information on the product to the user to a product provider. The information suggestion system includes a server 12, and a plurality of clients 14A and 14B connected to the server 12 via a network 16.

The client 14A is a user client used by each of a plurality of users who uses the information suggestion system 10, and the client 14B is a product provider client used by each of a plurality of product providers who also uses the information suggestion system 10.

The server 12 has a function of storing an image group which is uploaded from each user client 14A and is owned by each user in a storage region of each user in an online storage, and a function of suggesting the information on the product to each user and suggesting the information for suggesting the information on the product to each user to each product provider based on an analysis result of the image group of each user stored in the online storage.

The number of servers 12 is not limited to one, but a plurality of servers may be used. The server is a workstation including a control device, a storage device, and a communication device.

The user client 14A has a function of uploading the image group selected by each user from the image groups owned by the users to the server 12 and a function of displaying information suggested by the server 12.

The product provider client 14B has a function of displaying the information suggested by the server 12 and a function of requesting the server 12 to suggest the information on the product related to this information to each user based on the information suggested by the server 12.

Each of the clients 14A and 14B is a desktop personal computer (PC), a laptop PC, a tablet PC, or a portable terminal such as a portable phone and a smartphone that includes a control device, an input device, a storage device, a communication device, and a display (display device).

The user is a consumer who purchases and uses various products, and the product provider is a company or a local government that suggests information on various products to each user and sells the products. In the present invention, the product include intangible services in addition to tangible articles.

Each user and each product provider can create each account before using the information suggestion system 10, and can use the information suggestion system 10 after logging in the information suggestion system 10 based on their own account information.

The account information of the user includes information such as an age (year of birth), a gender, an address, a mail address, and a telephone number in addition to a user name (account name) and a password for login. The account information of the product provider includes information such as an address, an e-mail address, and a telephone number in addition to a user name and a password.

FIG. 2 is a block diagram of an embodiment showing a configuration of the server. The server 12 shown in FIG. 2 includes an online storage 18, an image group acquisition unit 20, an image analysis unit 22, a region information reception unit 24, an image extraction unit 26, an imaging number count unit 28, an imaging frequency calculation unit 30, an imaging purpose estimation unit 32, a suggestion information registration unit 34, a suggestion decision unit 36, a suggestion draft creation unit 38, and an information suggestion unit 40.

A storage region for each user is provided in the online storage 18. The online storage 18 stores the image group of each user to be uploaded from each user client 14A to the server 12 in the storage region of each user.

The image group of each user may include images shared with other users, that is, images that are published to other users, or may include images that are not shared with other users, that is, images that are not published to other users.

The image groups of the users stored in the online storage 18 can be used for various products and applications using the images such as photo prints and photo albums.

Subsequently, the image group acquisition unit 20 acquires the image group of one user stored in the online storage 18.

The image group acquisition unit 20 acquires the image groups of the plurality of users stored in the online storage 18. That is, a set of image groups including the image groups owned by the plurality of users is acquired.

The image group acquisition unit 20 may acquire the image group of one user randomly selected from all users who use the information suggestion system 10, or may sequentially acquire the image groups of the users. For example, the image group acquisition unit may acquire the image groups of the plurality of users randomly selected from all the users who use the information suggestion system 10, and may acquire the image groups of the plurality of users selected according to an attribute of the user such as the age, the gender, and the address such as a female in her twenties resident in Tokyo.

The image group acquisition unit 20 may acquire the image group of one user and the image groups of the plurality of users for each predetermined period, or may acquire the image group whenever a new image group is upload for each user and is stored in the online storage 18.

The image group acquisition unit 20 is not limited to the online storage 18, and may acquire the image group of each user from various storages, for example, a storage device of each user client 14A.

Subsequently, the image analysis unit 22 analyzes each image included in the image group of one user acquired by the image group acquisition unit 20, detects the attribute of each image, and detects a plurality of attributes of a plurality of images included in the image group of one user. That is, a set of attributes including the attributes of the plurality of images is detected.

The image analysis unit 22 analyzes each image included in the image group of the plurality of users acquired by the image group acquisition unit 20, and detects an imaging location of each image and an object appearing in each image.

An analysis item of the image is not particularly limited, and includes, for example, analysis of an image content such as detection of subjects (a person and an object other than the person) appearing in the image, detection of a face of the person, detection of an imaging direction of the image, detection of a scene (night view, sea, sand, sky, . . . ), and detection of an event (sports day, wedding ceremony, graduation ceremony, . . . ), analysis of quality of the image such as brightness, hue, contrast, and a degree of blurriness of the image, and detection of time information (imaging date and time) and positional information (Global Positioning System (GPS) information) (imaging location) included in accessory information of the image such as Exchangeable Image File Format (Exif). Only a part of the aforementioned analysis may be performed, or an image analysis other than the aforementioned analysis may be performed.

The attributes of the image include at least one of the imaging date and time of the image, the imaging location of the image, the imaging direction of the image, the person appearing in the image, the object appearing in the image, and the scene appearing in the image. The attributes of the image may include attributes other than the aforementioned attributes.

Subsequently, the region information reception unit 24 receives information on a region corresponding to at least one of a geographical region or a business region in which information is desired which is provided from each of the plurality of product providers.

The information on the region (geographical region and business region) limits images related to the products provided by the product provider in the image groups of the plurality of users.

The information on the geographical region limits the imaging location of the image. For example, in a case where the product provider provides the products in Tokyo, since images captured in locations other than Tokyo are unnecessary, the geographical region is limited to images captured in Tokyo. In this case, the geographical region may be a country-specific region. In a case where the geographical region is in Japan, the geographical region may be Honshu and Kyushu, may be East Japan and West Japan, may be Kanto and Kinki, may be a prefecture-specific region, or may be a municipality-specific region.

The information on the business region limits a type of the object appearing in the image. For example, in a case where the product provider is a company in a confectionery industry, since an image in which an object other than confectionery appears is unnecessary, the business region is limited to an image in which the confectionery appears. In the confectionery industry, the business region may be names of individual confectioneries such as "chocolate" and "candy", or may be comprehensive names of "confectionery", "Japanese confectionery", and "Western confectionery".

Subsequently, the image extraction unit 26 extracts, as a region-related image, an image related to the information on the region received by the region information reception unit 24 from the image groups of the plurality of users.

For example, the image extraction unit 26 extracts, as the region-related image, an image in which the information related to at least one of the imaging location of the image or the object appearing in the image is related to the information on the region provided by each product provider.

For example, the image extraction unit 26 extracts, as the region-related image, the image captured in Tokyo from the image groups of the plurality of users in a case where the geographical region is in Tokyo, and extracts, the region-related image, the image in which the confectionery appears from the image groups of the plurality of users in a case where the business region is in the confectionery industry.

Subsequently, the imaging number count unit 28 counts the imaging number of images of the same-attribute images (image group) for each attribute of the image detected by the image analysis unit 22 in the image group of one user. In the present invention, the same-attribute image refers to the image group having the same attribute for each attribute of the image. In other words, in a case where a certain one attribute is focused, the same-attribute images are the image group of which one attribute is the same content.

The imaging number count unit 28 counts the imaging number of images of the same type for each image of the same-type image (image group) in the image groups of the plurality of users. In the present invention, the same-type image refers to the image group which is captured in the same imaging location and in which the same object appears. In other words, the same-type image is the image group of which two attributes such as the imaging location of the image and the object appearing in the image are the same contents. That is, the same-type image is the image group including the same-attribute image of which the attribute such as the imaging location of the image is the same content and the same-attribute image of which the attribute such as the object appearing in the image is the same content.

In a case where the attribute is the imaging location of the image, the imaging number count unit 28 counts the imaging number of images captured at the same imaging location such as the image captured in Tokyo and the image captured in Osaka. In a case where the attribute is the object appearing in the image, the imaging number count unit counts the imaging number of images in which the same object appears such as the image in which chocolate appears and the image in which candy appears.

The imaging number count unit 28 counts the imaging number of images of the same-type images which are captured in Kushiro-shitsugen National Park and in which Japanese crane appears.

Subsequently, the imaging frequency calculation unit 30 calculates the imaging frequency of the same-attribute images from the imaging number of images of the same-attribute images counted by the imaging number count unit 28 for each attribute of the image in the image group of one user.

The imaging frequency calculation unit 30 calculates the imaging frequency of the same-type images from the imaging number of the same-type images for each same-type image counted by the imaging number count unit 28 in the image groups of the plurality of users.

In a case where the attribute is the imaging location of the image, for example, the imaging frequency calculation unit 30 calculates the imaging frequency of the images as (3/5) in a case where the total number of images included in one user's image group is five and the total number of images included in the image group of one user is five and the imaging number of images captured in Tokyo is three, and calculates the imaging frequency of the images as (2/5) in a case where the imaging number of images captured in Osaka is 2. The same applies to the case of the imaging frequency of the same-type images.

Subsequently, the imaging purpose estimation unit 32 estimates an imaging purpose of the same-attribute image for each attribute of the image. The imaging purpose estimation unit 32 sets the imaging purpose of the same-attribute image to the imaging purpose of each image included in the same-attribute image (image group).

The method by which the imaging purpose estimation unit 32 estimates the imaging purpose of the same-attribute image is not particularly limited, and, for example, the imaging purpose of the same-attribute image can be estimated based on the attributes of the images and the analysis results of the images.

Subsequently, the suggestion information registration unit 34 registers one or more pieces of suggestion information in which the imaging purpose and the information on the product are associated with each other.

For example, one or more pieces of suggestion information provided from each of the plurality of product providers are recorded in the suggestion information registration unit 34. For example, the information on the product is not particularly limited as long as the information related to the imaging purpose is used. However, in a case where the imaging purpose is, for example, the imaging of an image of a scene "sports", information related to sports equipment such as baseball bats and gloves is considered. In a case where the imaging purpose is the imaging of an image of "watching sports", information related to supporting goods such as a headband and a megaphone is considered.

The suggestion information is used in a case where the suggestion decision unit 36 acquires the information on the product to be suggested from the imaging purpose of the same-attribute image.

Subsequently, the suggestion decision unit 36 decides whether or not to suggest the information on the product related to the imaging purpose of the same-attribute image to one user who owns the same-attribute image depending on whether or not the imaging number and the imaging frequency of the same-attribute images satisfy a predetermined condition for each attribute of the image.

The suggestion decision unit 36 decides whether or not to suggest same-type image information related to the same imaging location of the same object of the same-type images to the product provider related to this same-type image information among the plurality of product providers depending on whether or not the imaging number and the imaging frequency of the same-type images which are captured in the same imaging location and in which the same object appears satisfy a predetermined condition in the region-related image extracted by the image extraction unit 26 or for the attributes of the plurality of users in the region-related image.

A case where the predetermined condition is satisfied means that, for example, the imaging number and the imaging frequency are equal to or larger than threshold values. The threshold values of the imaging number and the imaging frequency are not particularly limited, but the threshold value of the imaging number can be, for example, 100, and the threshold value of the imaging frequency can be, for example, (10/100) in a case where the imaging frequency is expressed by a ratio of (imaging number/total number of images included in image group). For example, in a case where it is assumed that the average number of images included in 100 images of a certain image group for all users is one and a standard deviation is three, the imaging number is the average number of images+standard deviation×3=1+3×3=10, and the threshold value of the imaging frequency is (10/100) described above. First, the threshold value of the imaging frequency for all the objects is obtained from the expression including the average number of images and the standard deviation, but may be adjusted based on a behavior of the user for the suggestion to the user to be described below. For example, in a case where the suggestion is performed to the user based on the threshold value of the initial imaging frequency but is not linked to the behavior of the user, the threshold value of the imaging frequency is increased, and thus, the suggestion to the user may be performed by narrowing down to the user who more frequently captures the object.

In a case where the imaging frequency is low even though the imaging number is large, or in a case where the imaging number is small even though the imaging frequency is high, it is difficult to correctly determine whether or not the same-attribute image matches hobby or preference of one user or whether or not the same-type image is information of interest for many users. In order to perform the correct determination, the imaging number and the imaging frequency need to satisfy a predetermined condition.

The attributes of the plurality of users include at least one of the age, the year of birth, the gender, or the address of the plurality of users. The attribute of the user can be acquired from the account information of the user, for example. The attribute of the user may include attributes other than the aforementioned attributes.

In a case where the imaging number and the imaging frequency of the same-attribute images satisfy the predetermined condition, the suggestion decision unit 36 decides to suggest the information on the product related to the imaging purpose of the same-attribute image to one user. Meanwhile, in a case where the imaging number and the imaging frequency of the same-attribute images do not satisfy the predetermined condition, the suggestion decision unit 36 decides not to suggest the information on the product related to the imaging purpose of the same-attribute image to one user.

In a case where the imaging number and the imaging frequency of the same-type images satisfy the predetermined condition, the suggestion decision unit 36 decides to suggest the same-type image information of this same-type image to the product provider related to this same-type image information. Meanwhile, in a case where the imaging number and the imaging frequency of the same-type images do not satisfy the predetermined condition, the suggestion decision unit decides not to suggest the same-type image information of the same-type image to the product provider related to this same-type image information.

Subsequently, the suggestion draft creation unit 38 creates a suggestion draft including information on the same object of the same-type image of which the imaging number and the imaging frequency satisfy the predetermined condition and a suggestion condition for suggesting the same-type image information of the same-type image of which the imaging number and the imaging frequency satisfy the predetermined condition to one or more users.

The suggestion draft is an example of the same-type image information, and is used, for example, in a case where the information suggestion unit 40 suggests the same-type image information to the product provider.

The information on the object includes, for example, information such as a name of the object, a location of the object, and a description of the object.

The suggestion conditions are not particularly limited. However, for example, in a case where a predetermined period elapses after the same-type image of which the imaging number and the imaging frequency satisfy the predetermined condition is previously uploaded, the suggestion condition includes a case where a specific condition is satisfied such as a case where the imaging number and the imaging frequency of the same-type image satisfy the predetermined condition.

The information on the object and the suggestion condition may include information and conditions other than the aforementioned information and conditions. The suggestion draft may include information other than the information on the object and the suggestion conditions, for example, suggestion contents to be suggested to the user.

The suggestion draft includes, for example, a suggestion of "Number of photos of Mt. Fuji is increasing. How about suggesting users who upload photos of Mt. Fuji going to Mt. Fuji?". In this case, "Mt. Fuji" is the information on the object, "Photos of Mt. Fuji is increasing." is the suggestion condition, and "How about suggesting going to Mt. Fuji?" is the suggestion content to be suggested to the user.

Subsequently, the information suggestion unit 40 suggests the information on the product decided to be suggested to one user by the suggestion decision unit 36 to the one user.

The information suggestion unit 40 suggests the same-type image information related to the same imaging location and the same object of the same-type image of which the imaging number and the imaging frequency satisfy the predetermined condition to the product provider related to this same-type image information among the plurality of product providers.

The suggestion method for the user and the product provider is not particularly limited. For example, an e-mail related to the suggestion may be transmitted to the user and the product provider, or the information of the suggestion may be displayed on the displays of the user client 14A and the product provider client 14B.

Next, an operation of the information suggestion system 10 will be described with reference to the flowcharts shown in FIGS. 3, 4, and 5. First, a case where information is suggested to one user will be described.

Each user instructs each user client 14A to select a desired image group of the image groups owned by each user and upload the selected image group to the server 12. Alternatively, each user may set to automatically upload the image group stored in a predetermined folder of the storage device of each client 14A in the server 12.

Accordingly, the image group of each user selected by each user is uploaded to the server 12 from each user client 14A, and is stored in the storage region of each user in the online storage 18.

In a case where the image groups of one or more users are stored in the online storage 18, the image group acquisition unit 20 acquires the image group of one user stored in the online storage 18 (step S11 of FIG. 3).

Subsequently, the image analysis unit 22 analyzes each image included in the image group of one user, detects an attribute of each image, and detects a plurality of attributes of the images included in the image group of one user (step S12 in FIG. 3).

Subsequently, the imaging number count unit 28 counts the imaging number of the same-attribute images in the image group of one user for each image attribute (step S13 of FIG. 3).

Subsequently, the imaging frequency calculation unit 30 calculates the imaging frequency of the same-attribute images from the imaging number of the same-attribute images in the image group of one user for each attribute of the image (step S14 of FIG. 3).

The imaging purpose estimation unit 32 estimates the imaging purpose of the same-attribute image for each attribute of the image (step S15 of FIG. 3). Any one or both of the calculation of the imaging number and the imaging frequency and the estimation of the imaging purpose may be performed first, or both may be processed in parallel.

Subsequently, the suggestion decision unit 36 decides whether or not to suggest the information on the product related to the imaging purpose of the same-attribute image to one user who owns this same-attribute image depending on whether or not the imaging number and the imaging frequency of the same-attribute images satisfy the predetermined condition for each attribute of the image (step S16 of FIG. 3).

Subsequently, the information suggestion unit 40 suggests the information on the product decided to be suggested to one user to the one user (step S17 of FIG. 3).

In the case of the present embodiment, the suggestion decision unit 36 searches for the suggestion information including an imaging purpose matching the imaging purpose of the same-attribute image of which the imaging number and the imaging frequency satisfy the predetermined condition from the one or more pieces of suggestion information registered in the suggestion information registration unit 34.

Subsequently, the information suggestion unit 40 suggests the information on the product included in the suggestion information searched for by the suggestion decision unit 36 to one user.

For example, in a case where the imaging purpose is "travel", the information suggestion unit 40 may suggest only one piece of information such as "We recommend travel to XXX." as the suggestion content. However, as a more preferable example, in a case where a message of "I collectively recommend transportation means, hotels, and tourist attraction tickets for trip to XXX. Do you want to see? Yes or No" is displayed on the display of the user client 14A and "Yes" is selected by the user, it is desirable that various services are subsequently displayed in a list, and the user can collectively make reservations for various services.

A list of services suggested to the user can be created from, for example, analysis results of images related to the past "XXX travel" stored in the online storage 18 by the user. The list of the services can be created from the analysis results of the image of the user related to the "XXX travel" stored in the online storage 18, the imaging location of the image related to "XXX travel" of the plurality of other users which is agreed, analyzed, and determined, and the object appearing in the image.

Thereafter, in a case where the image group of each user is uploaded to the server 12 and is stored in the storage region of each user in the online storage 18, the image group of the user is sequentially acquired, and the aforementioned operation is similarly repeated for the image group of each user.

Here, in a case where the image group shared (published) on, for example, Facebook (registered trademark) among SNSs is analyzed, the hobby and the preference that the user who shares the image group wants to share with friends are expressed, and in a case where the image group shared in LINE (registered trademark) and WhatsApp (registered trademark) is analyzed, the hobby and the preference that the user wants to share with more close friends and family which is only each talk member are expressed.

In a case where a purchase history of the user in online shops such as Amazon.com (registered trademark) and Rakuten Ichiba (registered trademark) is analyzed, the hobby and the preference related to the products purchased by the user are expressed.

However, there are no methods that can widely express the hobby and the preference of the user by one application or web service. At present, since smartphones have become widespread, various images of interest to users have been captured and stored by built-in cameras. In a case where there is an application or a web service that can integrally view the image groups of the user, the hobby and the preference of the user may be widely displayed.

Meanwhile, in an initial state, the image group of the user may be merely arranged in chronological order in general. In a case where such an image group is analyzed in complete harmony, it is considered that the estimation of the hobby and the preference of the user is not successful.

Meanwhile, in the information suggestion system 10, the imaging purpose estimation unit 32 estimates the imaging purpose of the same-attribute image, and thus, the hobby and the preference of the user can be estimated from the imaging purpose for each same-attribute image.

In a case where the attribute is the imaging location, the imaging purpose estimation unit 32 estimates that the imaging purpose of the same-attribute image captured near the user' home is, for example, the imaging of an image of "daily". It is estimated that the imaging purpose of the same-attribute image captured at a location slightly away from home is the imaging of an image of an unusual "event", and the imaging purpose of the same-attribute image captured at a place far away from home is the imaging of an image of "travel".

In a case where the attribute is the person appearing in the image, the imaging purpose estimation unit 32 estimates that the imaging purpose of the same-attribute image in which the person is not a main subject, for example, for a certain time zone is the imaging of a "personal" image. It is estimated that the imaging purpose of the same-attribute image in which family appears is the imaging of a "family-like" image and the imaging purpose of the same-attribute image in which a person other than the family appears is the imaging of an image of a "friend relationship".

For example, even though a scene of the image is detected and it is determined that the image is related to baseball, whether the user who owns the image is playing baseball or likes watching baseball games cannot be determined by only the image related to the baseball.

In this case, in a case where the attribute is the object appearing in the image and several friends of the user appear in the image, since there is a high possibility that the user is playing baseball, the imaging purpose estimation unit 32 estimates that the imaging purpose of the image is the imaging of the image of the scene such as "play sports". In a case where the image is captured at a famous baseball stadium or a famous baseball player appears in the image, it is estimated that the user likes watching baseball games, and the imaging purpose of the image is the imaging of the image of "watching sports".

As described above, the information suggestion system 10 estimates the imaging purpose of the same-attribute images for each attribute of the image, and suggests the information on the product related to the imaging purpose of the same-attribute images to the user. Therefore, the personal hobby and preference of the user, the hobby and preference shared with friends, or the hobby and preference that family members like can be appropriately determined from the imaging purpose of the same-attribute image, the hobby and preference of the user can be widely and appropriately estimated, and the information on the corresponding product can be appropriately suggested.

EXAMPLE 1

It is assumed that a plurality of images (photos) of "Japanese crane in winter" is included in the image group of one user. It is considered that the imaging purpose is the imaging of an image of "Japanese crane" or "Japanese crane in winter". There is a high possibility that the image of "Japanese crane" is captured in Kushiro-shitsugen National Park. It is expected that the user who captures such an image is the hobby of photography and possesses expensive camera equipment. It is considered that there is a possibility that many users who capture "Japanese crane in winter" visit, stay, and sightsee Kushiro again in the winter of the next year.

In this case, Kushiro city and Kushiro Tourism Association are assumed as the product providers. In a case where it is near the season in which "Japanese crane in winter" visits in the next winter, tourist information of Kushiro city and information on accommodation facilities are suggested to one user who has a plurality of images of "Japanese crane in winter" in the image group. Further, information on camera equipment of a new product may be suggested to the one user from a sales company of the camera equipment as the product provider.

EXAMPLE 2

It is assumed that a plurality of images (photos) of the scene of "ski" is included in the image group of one user. It is also assumed that the images of the scene of "ski" are included not only for a single year but for a plurality of years. It is considered that the imaging purpose is the imaging of the image of the scene of "ski". There is a possibility that the hobby of the user is going skiing every year.

In this case, a ski resort operating company is assumed as the product provider. In a case where it is near the ski season in the next year, information on a ski resort and accommodation facilities is suggested to one user in which many images of the scene of "ski" are included in the image group.

EXAMPLE 3

It is assumed that a plurality of images (photos) of "TDL (Tokyo Disneyland (registered trademark))" is included in the image group of one user. It is also assumed that the images of "TDL" are included not in a single year but in a plurality of years. It is considered that the imaging purpose is the imaging of the image of "TDL". There is a high possibility that the user likes "TDL" and goes to "TDL" every year.

In this case, a travel company is assumed as the product provider. Information on a travel plan to "TDL" is suggested to one user in which many images of "TDL" are included in the image group.

EXAMPLE 4

It is assumed that a plurality of images (photos) of "railway" is included in the image group of one user. It is considered that the imaging purpose is the imaging of the image of "railway". There is a high possibility that the user likes railways and goes to railways in various places to capture the images of "railways".

In this case, a travel company is assumed as the product provider. Information related to an imaging location of the railway as a new imaging spot and a type (steam locomotive or train) of a railway vehicle which does not appear in the image included in the image group of one user is suggested to one user in which many images of "railway" are included in the image group.

In a case where the information on the product to be suggested to the user includes information on a product related to a periodic event that occurs at a certain cycle, the information suggestion unit 40 may suggest the information on the product related to the periodic event before a predetermined period from a timing at which the next periodic event occurs.

The periodic event may include, for example, purchase of daily necessities such as shampoo and rinse, and reservation for the travel, but may include other events.

Accordingly, it is possible to periodically suggest the purchase of the product to be periodically purchased by one user to one user before one user purchases the product, and it is possible to promote the sale of the product.

The suggestion information registration unit 34 may register, as one or more pieces of suggestion information, suggestion information in which two or more imaging purposes and pieces of information on the products are associated with each other.

In this case, the suggestion decision unit 36 searches for the suggestion information including two or more imaging purposes matching two or more imaging purposes of two or more same-attribute images of which the imaging number and the imaging frequency satisfy the predetermined condition.

Accordingly, it is possible to suggest information on a product corresponding to a combination of two or more imaging purposes to one user. For example, in a case where the imaging purposes are two types of imaging of a winter image and imaging of an image of the Japanese crane, information on a product related to the Japanese crane in winter can be suggested to one user.

In a case where the imaging purpose is the imaging of an object predetermined by the information suggestion system 10, the suggestion decision unit 36 may decide to suggest the information on the product related to the imaging purpose of the image on which the predetermined object is captured to the user regardless of whether or not the predetermined condition is satisfied.

Accordingly, it is possible to immediately suggest the information on the product related to the imaging purpose of the image in which the predetermined object is captured to the user who uploads the image regardless of the imaging number and the imaging frequency. For example, in a case where the predetermined object is the Japanese crane, the information on the product related to the Japanese crane is immediately suggested to the user who uploads the image of the Japanese crane.

The predetermined object is not particularly limited, and may be any object such as an unusual object or an object requested by the product provider.

The imaging purpose estimation unit 32 may create a learned model which learns a relationship between the imaging number, the imaging frequency, and the imaging purpose of a learning same-attribute images having the same attribute in advance for a plurality of sets of learning same-attribute images, and may estimate the imaging purpose of the same-attribute image from the same-attribute image by using the learned model.

Accordingly, it is possible to more accurately estimate the imaging purpose of the same-attribute image from the same-attribute image as the number of sets of the learning same-attribute images increases.

In a case where the learned model is created, information on the imaging purpose corresponding to the imaging number and the imaging frequency of the learning same-attribute images is provided for the plurality of sets of learning same-attribute images. For example, in a case where the information on the product related to the imaging purpose is suggested to the user and the user purchases the product corresponding to the information of this product, it possible to determine that this imaging purpose is correct, and in a case where the user does not purchase the product corresponding to the information on this product, it is possible to determine that this imaging purpose is not correct.

The learned model can be created, for example, from a neural network.

In this case, for example, the imaging purpose estimation unit 32 performs change processing for changing a coefficient of each node constituting the neural network such that an output error based on the imaging purpose output in a case where the imaging number and the imaging frequency of the plurality of sets or one set of learning same-attribute images are input is minimized in a case where the imaging number and the imaging frequency of one set of learning same-attribute images and the information on the imaging purpose corresponding to the imaging number and the imaging frequency of the one set of learning same-attribute images are acquired. For example, in a case where an imaging purpose 1 is the imaging of the image of the person, the change processing is performed such that an output error based on the imaging purpose 1 is minimized, and in a case where an imaging purpose 2 is the imaging of an image of animal, the change processing is performed such that an output error based on the imaging purpose 2 is minimized.

The imaging purpose estimation unit 32 learns the relationship between the imaging number and the imaging frequency of the learning same-attribute images by repeatedly performing the above-described change processing. Accordingly, it is possible to create a learned model in which the coefficient of each node constituting the neural network is changed such that the output error based on each imaging purpose corresponding to the imaging number and the imaging frequency is minimized. For example, the coefficient of each node constituting the neural network is changed such that the output errors based on the imaging purpose 1 and the imaging purpose 2 for the imaging number and the imaging frequency is minimized.

The imaging purpose estimation unit 32 estimates that the imaging purpose of which the output error is minimized is the most accurate imaging purpose for the imaging number and the imaging frequency of the same-attribute images by using the learned model.

A learning method in a case where the learned model is created is not particularly limited as long as a method that can learn the relationship between the imaging number, the imaging frequency, and the imaging purpose from the plurality of learning same-attribute images and generate the learned model is used.

As described above, for example, deep learning that uses a hierarchical neural network as one example of machine learning which is one of technologies of artificial intelligence (AI) can be used as the learning method.

Machine learning other than the deep learning may be used, an artificial intelligence technology other than the machine learning may be used, or a learning method other than artificial intelligence technology may be used.

Next, a case where information is suggested to the product provider will be described.

In a case where the image groups of the plurality of users are stored in the online storage 18, the image groups of the plurality of users stored in the online storage 18 are acquired by the image group acquisition unit 20 (step S21 of FIG. 4).

Subsequently, the image analysis unit 22 analyzes each image included in the image group of the plurality of users, and detects the imaging location of each image and the object appearing in each image (step S22 of FIG. 4).

Subsequently, the imaging number count unit 28 counts the imaging number of the same-type images in the image groups of the plurality of users for each same-type image (step S23 of FIG. 4).

Subsequently, the imaging frequency calculation unit 30 calculates the imaging frequency of the same-type images from the imaging number of same-type images for each same-type image in the image groups of the plurality of users (step S24 of FIG. 4).

Subsequently, the information suggestion unit 40 suggests the same-type image information of the same-type image of which the imaging number and the imaging frequency satisfy the predetermined condition to the product provider related to the same-type image information (step S25 of FIG. 4).

The product provider can simultaneously suggest the information on the product related to the same-type image information to one or more users, for example, a plurality of users who uploads the same-type image.

In the information suggestion system 10, the same-type image information of the same-type image is suggested to the product provider related to the same-type image information as described above. Therefore, it is possible to suggest the information of interest to many users who upload the same-type image to the product provider. In other words, the product provider can suggest the information on the product of interest to many users who upload the same-type image to the user.

For example, in a case where the local government is worried about "We want to make some kind of sightseeing appeal for this town, but we do not know what is the appeal point of this town.", it is possible to suggest the information related to the imaging location in which the imaging number is large and the object of which the imaging number is large for this town from the analysis result of the image groups of the plurality of users stored in the online storage 18 to the local government, and it is possible to help the local government to make the sightseeing appeal.

EXAMPLE 5

It is assumed that a plurality of images of "a location used in the drama of City A" is included in the image groups of the plurality of users. In recent years, persons have come to this location, and the number of persons who captures this location has been increased. It can be seen from the analysis result of the image groups of the plurality of users that the number of who captures the photos at this location is increased.

From this case, "How about making the location a tourist spot?" is suggested to City A. The "location" is the same imaging location of the same-type image information, "City A" is the product provider, and "How about making the location as a tourist spot?" is the same-type image information.

EXAMPLE 6

It is assumed that the image group of one user does not include an image (photo) of "railway" of City B but image groups of a plurality of other users include a plurality of images of "railway" of City B.

In this case, information for suggesting the information on the product related to "railway" (steam locomotive or train) of City B to the one user is suggested to the product provider related to the information on the product. For example, information such as transportation means in City B and accommodation information in City B which are considered to be necessary for capturing the image of "railway" in B city is suggested to the travel agency.

EXAMPLE 7

The imaging location of each image included in the image groups of the plurality of users is specified by utilizing the positional information included in the accessory information of the image and the information such as a landmark appearing in the image, and the information of the specified imaging location of the image and the information on the object appearing in this image are associated with each other. It is assumed that an object appearing in a plurality of images included in image groups of other multiple users does not appear in the image included in the image group of one user.

In this case, the information for suggesting the information on the product related to the imaging location of the image in which the object appears to one user is suggested to the product provider related to the information of this product.

Each product provider can provide information on a region in which the same-type image information is desired to the server 12.

In this case, the region information reception unit 24 receives the information on the region provided by each product provider (Step S31 of FIG. 5).

Subsequently, the image extraction unit 26 extracts, as the region-related image, the image related to the information on the region provided by one product provider from the image groups of the plurality of users (step S32 of FIG. 5).

It is assumed that the analysis of each image is already ended.

Since the region-related image is the image related to each product provider among the image groups of the plurality of user, the subsequent processing can be rapidly performed on the region-related image by processing the region-related image rather than processing the image groups of the plurality of users.

Subsequently, the imaging number count unit 28 counts the imaging number of the same-type image for each same-type image in the region-related image or for the attributes of the plurality of users in the region-related image (step S33 of FIG. 5).

Subsequently, the imaging frequency calculation unit 30 calculates the imaging frequency of the same-type images from the imaging number of the same-type images for each same-type image in the region-related image or for the attributes of the plurality of users in the region-related image (step S34 of FIG. 5).

Subsequently, the information suggestion unit 40 suggests the same-type image information of the same-type image of which the imaging number and the imaging frequency satisfy the predetermined condition to the product provider that provides the information on the region corresponding to the region including at least one of the same imaging location or the same object of the same-type image of which the imaging number and the imaging frequency satisfy the predetermined condition (step S35 of FIG. 5).

Thereafter, similarly, the information of the region provided by each product provider is sequentially acquired, and the aforementioned operation is repeated for the region-related image related to the information on the region provided by each product provider.

The suggestion decision unit 36 may decide whether or not to suggest the same-type image information of the same-type image to the product provider related to this same-type image information among the plurality of product providers depending on whether or not the imaging number and the imaging frequency of the same-type images satisfy the predetermined condition in the region-related image or for the attributes of the plurality of users in the region-related image.

In this case, the information suggestion unit 40 suggests the same-type image information decided to be suggested to the product provider related to the same-type image information decided to be suggested.

In a case where the imaging number and the imaging frequency of the same-type image satisfy the predetermined condition, the suggestion draft creation unit 38 may create the suggestion draft related to the same-type image of which the imaging number and the imaging frequency satisfy the predetermined condition.

In this case, the information suggestion unit 40 transmits the suggestion draft to the product provider related to the same-type image information of the same-type image of which the imaging number and the imaging frequency satisfy the predetermined condition.

The information suggestion unit 40 may transmit on suggestion draft selected among the plurality of existing suggestion drafts or the suggestion draft created by the person to the product provider in addition to the suggestion draft created by the suggestion draft creation unit 38.

The product provider related to the same-type image information can provide a condition for suggesting the information on the product related to the same-type image information to one or more users to the server 12 based on the suggestion draft, and can request the server 12 to suggest the information on the product related to the same-type image information to one or more users.

In this case, the information suggestion unit 40 suggests the information on the product related to the same-type image information based on the condition which is provided by each of the plurality of product providers to suggest the information on the product related to the same-type image information to one or more users.

Each product provider may directly suggest the information to each user instead of requesting the server 12 to suggest the information to the user. Each product provider may register the suggestion information obtained by associating the same-type image with the information on the product related to the same-type image information of this same-type image in the suggestion information registration unit 34. Accordingly, it is possible to acquire the information on the product related to the same-type image information of this same-type image from the suggestion information registration unit 34 based on the same-type image of which the imaging number and the imaging frequency satisfy the predetermined condition.

In a case where a predetermined period elapses after the same-type image of which the imaging number and the imaging frequency satisfy the predetermined condition is previously uploaded to the online storage 18 in the image group of one user, the information suggestion unit 40 may suggest that the product provider related to the same-type image information of the same-type image in which the imaging number and the imaging frequency satisfy the predetermined condition suggests the information on the product related to the same-type image information of the same-type image in which the imaging number and the imaging frequency satisfy the predetermined condition to one user.

Accordingly, the product provider can periodically suggest the information on the product related to the same-type image information of the same-type image to one user. Since one user who uploads the same-type image is considered to be interested in the information on the product related to the same-type image information of the same-type image, it is possible to promote the sale of the product.

The predetermined period can be appropriately decided according to the suggestion content.

For example, when images uploaded by a user who is uploading the images captured at a travel destination are the same-type images of which the imaging number and the imaging frequency satisfy the predetermined condition and the predetermined period elapses after the image is previously uploaded by the user, the information suggestion unit suggests the product provider of the travel agency that the user is suggested to travel to the same travel destination as the previous time.

Accordingly, for example, in a case where one year elapses after the image is previously uploaded by the user, the product provider requests the server 12 to suggest information on a travel to the same travel destination as the previous time.

Accordingly, it is possible to suggest the information on the product by targeting a repeater that regularly makes a reservation such as a travel.

The information suggestion unit 40 may suggest that the product provider related to the same-type image information of the same-type image of which the imaging number and the imaging frequency satisfy the predetermined condition suggests the information on the product related to the same-type image information of the same-type image of which the imaging number and the imaging frequency satisfy the predetermined condition to a user having a similar attribute which does not upload the same-type image of which the imaging number and the imaging frequency satisfy the predetermined condition in a case where the imaging number and the imaging frequency of the same-type images satisfy the predetermined condition in the image groups of the plurality of users.

The user having the similar attribute includes a user having attributes, for example, the age, the year of birth, the gender, and the address similar to the plurality of users, or a user who captures similar images, for example, a cat image, a train image, a flower image.

Accordingly, the product provider can suggest the information on the product related to the same-type image information of the same-type image to the user having the similar attribute. Since the user having the similar attribute is considered to be interested in the information on the product related to the same-type image information of the same-type image, it is possible to promote the sale of the product.

For example, in a case where the imaging frequency of the same-type images captured by the plurality of users at a certain imaging location exceeds a threshold value, the information suggestion unit suggests that the product provider such as the travel agency suggests the travel to this imaging location to the user having the similar attribute who does not upload the same-type image.

Accordingly, the product provider requests the server 12 to immediately suggest, for example, the information on the travel to the imaging location to the user having the similar attribute.

Accordingly, the information on the product can be suggested to the user having the similar attribute, that is, an inexperienced user who does not capture the same-type image captured by the plurality of users, that is, who has not gone to the imaging location at which the same-type image is captured as a target.

From the viewpoint of protection of personal information, it is assumed that the following items 1 to 4 are implemented in a case where the information suggestion system 10 is operated.

1. It is assumed that the administrator of the information suggestion system 10 obtains the agreement of the user about the analysis of the image group of the user stored in the online storage 18 and the suggestion of various pieces of information to the user and the product provider from the analysis result.

2. It is assumed that the information suggestion system 10 obtains the agreement of the user about whether a subject that suggests the information on the product to the user is the information suggestion system or the product provider.

3. It is assumed that the information suggestion system obtains the agreement of the user about the delivery of information necessary to suggest the information on the product to the user to the product provider in the case where the subject of (2) described above is the product provider. It is preferable that the necessary information is minimum necessary information such as only an e-mail address.

4. It is assumed that the information suggestion system does not provide information of the user and information with which the user is specified in a case where the information is provided such as a case where the image groups of the plurality of users are analyzed and the information on the object of which the imaging number is large is transmitted to the product provider. It is assumed that the information suggestion system obtains the agreement of the user in advance about the providing of the information after anonymizing such information.

In the device according to the present invention, for example, a hardware configuration of processing units that execute various processing such as the image group acquisition unit 20, the image analysis unit 22, the region information reception unit 24, the image extraction unit 26, the imaging number count unit 28, the imaging frequency calculation unit 30, the imaging purpose estimation unit 32, the suggestion information registration unit 34, the suggestion decision unit 36, the suggestion draft creation unit 38, and the information suggestion unit 40 may be dedicated hardware or may be various processors or computers that execute programs.

Various processors include a central processing unit (CPU) which is a general purpose processor functioning as various processing units by executing software (program), a programmable logic device (PLD) which is a processor capable of changing a circuit configuration after a field programmable gate array (FPGA) is manufactured, and a dedicated electric circuit which is a processor having a circuit configuration designed as a dedicated circuit in order to perform specific processing such as application specific integrated circuit (ASIC).

One processing unit may be constituted by one of the various processors. One processing unit may be obtained by combining the same kind or different kinds of two or more processors, for example, by combining a plurality of FPGAs, or may be obtained by combining the FPGA and the CPU. The plurality of processing units may be constituted by one of the various processors or may be constituted by using one processor obtained by combining two or more of the plurality of processing units.

For example, one processor is constituted by combining one or more CPUs and software so as to be represented by the computers such as the server and the client, and this processor functions as the plurality of processing units. A processor that realizes the functions of the entire system including the plurality of processing units by using one integrated circuit (IC) chip is used so as to be represented by a system on chip (SoC).

More specifically, the hardware configuration of the various processors is an electric circuitry obtained by combining circuit elements such as semiconductor elements.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: information suggestion system
12: server
14A: user client
14B: product provider client
16: network
18: online storage
20: image group acquisition unit
22: image analysis unit
24: region information reception unit
26: image extraction unit
28: imaging number count unit
30: imaging frequency calculation unit
32: imaging purpose estimation unit
34: suggestion information registration unit
36: suggestion decision unit
38: suggestion draft creation unit
40: information suggestion unit

What is claimed is:
1. An information suggestion system comprising:
an image group acquisition unit that acquires an image group of a user stored in a storage;
an image analysis unit that detects an attribute of each image included in the image group of the user by analyzing the each image, and detects a plurality of attributes of a plurality of images included in the image group of the user;
an imaging number count unit that counts an imaging number of same-attribute images having a same attribute for each attribute in the image group of the user;
an imaging frequency calculation unit that calculates an imaging frequency of the same-attribute images from the imaging number of the same-attribute images for each attribute in the image group of the user;
an imaging purpose estimation unit that estimates an imaging purpose of the same-attribute images for each attribute;
a suggestion decision unit that decides whether or not to suggest information on a product related to the imaging purpose of the same-attribute images to the user depending on whether or not the imaging number and the imaging frequency of the same-attribute images satisfy a predetermined condition for each attribute;
an information suggestion unit that suggests, to the user, the information on the product decided to be suggested to the user;
wherein the imaging purpose estimation unit creates a learned model which learns a relationship between an imaging number and an imaging frequency of learning same-attribute images having a same attribute and an imaging purpose in advance for a plurality of sets of the learning same-attribute images, and estimates the imaging purpose of the same-attribute images from the same-attribute images by using the learned model,
wherein the learned model is a neural network,
wherein in a case where information on an imaging number and an imaging frequency of one set of the learning same-attribute images and the imaging purpose corresponding to the imaging number and the imaging frequency of the one set of the learning same-attribute images is obtained, and
wherein the imaging purpose estimation unit performs change processing for changing a coefficient of each node constituting the neural network such that an output error based on an imaging purpose output in a case where the imaging number and the imaging frequency of the plurality of sets and the one set of the learning same-attribute images are input is minimized, and creates the learned model by repeatedly performing the change processing.

2. The information suggestion system according to claim 1,
wherein the information on the product to be suggested to the user includes information on a product related to a periodic event occurring at a predetermined cycle, and
the information suggestion unit suggests the information on the product related to the periodic event to the user before a predetermined period from a timing when a next periodic event occurs.

3. The information suggestion system according to claim 1, further comprising:
a suggestion information registration unit that registers one or more pieces of suggestion information obtained by associating the imaging purpose with the information on the product,
wherein the suggestion decision unit searches for suggestion information including an imaging purpose matching an imaging purpose of same-attribute images of which the imaging number and the imaging frequency satisfy the predetermined condition from among the one or more pieces of suggestion information, and the information suggestion unit suggests the information on the product included in the suggestion information searched for by the suggestion decision unit to the user.

4. The information suggestion system according to claim 3, wherein the suggestion information registration unit registers, as the one or more pieces of suggestion information, suggestion information obtained by associating two or more imaging purposes with the information on the product, and the suggestion decision unit searches for suggestion information including two or more imaging purposes matching two or more imaging purposes of two or more same-attribute images of which the imaging number and the imaging frequency satisfy the predetermined condition.

5. The information suggestion system according to claim 1, wherein the attribute includes at least one of an imaging date and time of an image, an imaging location of an image, an imaging direction of an image, a person appearing in an image, an object appearing in an image, or a scene appearing in an image.

6. The information suggestion system according to claim 1, wherein the imaging purpose is imaging of a predetermined object, and the suggestion decision unit decides to suggest information on a product related to an imaging purpose of an image in which the predetermined object is captured to the user regardless of whether or not the predetermined condition is satisfied.

7. The information suggestion system according to claim 1, wherein the image group of the user includes an image that is not published to other users.

8. An information suggestion method comprising:

acquiring, by an image group acquisition unit, an image group of a user stored in a storage;

detecting, by an image analysis unit, an attribute of each image included in the image group of the user by analyzing the each image, and detecting a plurality of attributes of a plurality of images included in the image group of the user;

counting, by an imaging number count unit, an imaging number of same-attribute images having a same attribute for each attribute in the image group of the user;

calculating, by an imaging frequency calculation unit, an imaging frequency of the same-attribute images from the imaging number of the same-attribute images for each attribute in the image group of the user;

estimating, by an imaging purpose estimation unit, an imaging purpose of the same-attribute images for each attribute;

deciding, by a suggestion decision unit, whether or not to suggest information on a product related to the imaging purpose of the same-attribute images to the user depending on whether or not the imaging number and the imaging frequency of the same-attribute images satisfy a predetermined condition for each attribute;

suggesting, by an information suggestion unit, to the user, the information on the product decided to be suggested to the user, wherein a learned model which learns a relationship between an imaging number and an imaging frequency of learning same-attribute images having a same attribute and an imaging purpose is created in advance for a plurality of sets of the learning same-attribute images, and the imaging purpose of the same-attribute images is estimated from the same-attribute images by using the learned model, wherein the learned model is a neural network, wherein in a case where information on an imaging number and an imaging frequency of one set of the learning same-attribute images and the imaging purpose corresponding to the imaging number and the imaging frequency of the one set of the learning same-attribute images is obtained, wherein change processing for changing a coefficient of each node constituting the neural network is performed such that an output error based on an imaging purpose output in a case where the imaging number and the imaging frequency of the plurality of sets and the one set of the learning same-attribute images are input is minimized, and wherein the learned model is created by repeatedly performing the change processing.

9. The information suggestion method according to claim 8, wherein the information on the product to be suggested to the user includes information on a product related to a periodic event occurring at a predetermined cycle, and the information on the product related to the periodic event is suggested to the user before a predetermined period from a timing when a next periodic event occurs.

10. The information suggestion method according to claim 8, further comprising:

registering, by a suggestion information registration unit, one or more pieces of suggestion information obtained by associating the imaging purpose with the information on the product, wherein suggestion information including an imaging purpose matching an imaging purpose of same-attribute images of which the imaging number and the imaging frequency satisfy the predetermined condition is searched from among the one or more pieces of suggestion information, and the information on the product included in the searched suggestion information is suggested to the user.

11. The information suggestion method according to claim 10, wherein suggestion information obtained by associating two or more imaging purposes with the information on the product is registered as the one or more pieces of suggestion information, and suggestion information including two or more imaging purposes matching two or more imaging purposes of two or more same-attribute images of which the imaging number and the imaging frequency satisfy the predetermined condition is searched for.

12. The information suggestion method according to claim 8, wherein the attribute includes at least one of an imaging date and time of an image, an imaging location of an image, an imaging direction of an image, a person appearing in an image, an object appearing in an image, or a scene appearing in an image.

13. The information suggestion method according to claim 8, wherein the imaging purpose is imaging of a predetermined object, and information on a product related to an imaging purpose of an image in which the predetermined object is captured is decided to be suggested to the user regardless of whether or not the predetermined condition is satisfied.

14. The information suggestion method according to claim 8,
wherein the image group of the user includes an image that is not published to other users.

15. A non-transitory computer-readable recording medium having a program causing a computer to execute the steps of the information suggestion method according to claim 8 recorded thereon.

\* \* \* \* \*